United States Patent
Bragg

(10) Patent No.: US 8,565,716 B2
(45) Date of Patent: Oct. 22, 2013

(54) DEVICES, SYSTEMS AND METHODS FOR DETECTING PROXIMAL TRAFFIC

(75) Inventor: Casey Bragg, Dallas, TX (US)

(73) Assignee: AT&T Mobility II LLC, Atlanta, GA (US)

(*) Notice: Subject to any disclaimer, the term of this patent is extended or adjusted under 35 U.S.C. 154(b) by 358 days.

(21) Appl. No.: 12/335,470

(22) Filed: Dec. 15, 2008

(65) Prior Publication Data

US 2010/0151814 A1    Jun. 17, 2010

(51) Int. Cl.
*H04M 11/04* (2006.01)
*H04W 24/00* (2009.01)
*H04B 7/00* (2006.01)

(52) U.S. Cl.
USPC .............. 455/404.2; 455/456.1; 455/521

(58) Field of Classification Search
USPC .................... 455/566, 456.2, 426.1, 561, 455/404.1–404.2; 340/870.09; 379/37
See application file for complete search history.

(56) References Cited

U.S. PATENT DOCUMENTS

| | | | |
|---|---|---|---|
| 6,463,272 B1* | 10/2002 | Wallace et al. | 455/404.2 |
| 7,015,817 B2* | 3/2006 | Copley et al. | 340/573.4 |
| 7,305,076 B1* | 12/2007 | Henderson | 379/142.04 |
| 7,519,351 B2* | 4/2009 | Malone, III | 455/404.1 |
| 7,778,625 B2* | 8/2010 | Yamauchi et al. | 455/404.1 |
| 2003/0040302 A1* | 2/2003 | Okada | 455/414 |
| 2004/0218687 A1* | 11/2004 | Santhoff | 375/295 |
| 2005/0048948 A1* | 3/2005 | Holland et al. | 455/404.1 |
| 2005/0200479 A1* | 9/2005 | James | 340/539.18 |
| 2006/0009191 A1* | 1/2006 | Malone, III | 455/404.1 |
| 2006/0178128 A1* | 8/2006 | Eaton et al. | 455/404.1 |
| 2007/0026889 A1* | 2/2007 | Yamauchi et al. | 455/552.1 |
| 2007/0111703 A1* | 5/2007 | Holland et al. | 455/404.2 |
| 2007/0255116 A1* | 11/2007 | Mehta et al. | 600/300 |
| 2009/0093229 A1* | 4/2009 | Grunow et al. | 455/404.2 |
| 2009/0264094 A1* | 10/2009 | Smith | 455/404.2 |

* cited by examiner

*Primary Examiner* — Ariel Balaoing
*Assistant Examiner* — Christopher Kohlman
(74) *Attorney, Agent, or Firm* — Hartman & Citrin LLC

(57) ABSTRACT

Devices, systems and methods are disclosed which relate to a telecommunications network, including a mobile network device, wherein, upon an event, a mobile network device enters a mode of operation defined as a sleep mode interrupted by periodic transmissions of a plurality of mobile network device and user information. Such a mode is referred to throughout this disclosure as an "emergency mode of operation" of the mobile network device. The plurality of mobile network device and user information includes information regarding a location of the mobile network device, a level of threat facing its user, the user's surroundings, etc. Events which trigger the mode of operation include a network command, user interaction, etc.

12 Claims, 6 Drawing Sheets

DEVICES, SYSTEMS AND METHODS FOR DETECTING PROXIMAL TRAFFIC

BACKGROUND OF THE INVENTION

1. Field of the Invention

The present invention relates to the field of telecommunications. In particular, the present invention relates to emergency operation of a mobile network.

2. Background of the Invention

Providing for reliable means of communication between those in distress and authorities is one of the most crucial aspects of managing an emergency situation. Systems and devices for wirelessly sending out a distress signal are known in the art. For example, Personal Locator Beacons (PLBs) can send out a distress signal, possibly including GPS information, for reception by specialized satellites, which forward the signal to rescue authorities. Typically such a beacon is actuated manually by a person in distress. Such a system has several drawbacks including the time it takes for the specialized satellites to detect the distress signal and the need for specialized hardware in the form of a PLB for each user. Further, such a system does not provide any way for the person in distress to indicate to what extent they are in danger.

More recently, such functionality has been integrated into mobile phones and mobile phone networks, eliminating the need for specialized hardware to send the distress signal. There are systems whereby users of mobile devices can notify a communications server that they are currently in distress or, for a specified time period, could possibly be in distress. User information, including location information, can then be forwarded to security personnel for action.

Such systems have drawbacks in some emergency situations, particularly large-scale disasters, such as earthquakes, hurricanes, tornadoes, floods, fires, etc. In such an event, the usual mobile network may be no longer working. Although such a system allows individual users to disclose information about their predicament, it does not provide any means for efficiently organizing all this incoming information and disseminating it on a wide scale to rescuers. Furthermore, people in distress may be injured, unconscious, or otherwise not able to initiate a distress call. For example, in the event of a missing child, the child may not know that they should get in touch with the police. In some cases, authorities may know the identity of an incapacitated person but have no means of tracking or otherwise getting in touch with them—for example, in the event of a hostage taking. A purely user-initiated emergency distress system does not allow for authorities to initiate the emergency distress features of mobile network devices, which may be necessary in events, such as the release of a toxic gas, where it may not be immediately apparent that a disaster has happened at all.

Especially in a large-scale disaster situation, it is very easy for communications networks to be overwhelmed. Frightened users may swamp a 911 network with calls. The study "Emergency Communication and Information Issues in Terrorist Events Involving Radioactive Materials", by Steven Becker, identified a concern that the telephone system, and especially the 911 system, would be overwhelmed in the event of a terrorist attack involving radioactive materials. This is one of the chief concerns emergency response professionals have about communications during such an attack. Some survivors of the August 2007 Interstate 35W bridge collapse in Minneapolis were unable to inform their families of their whereabouts, due to a surge in traffic on mobile phone networks. A purely user-initiated emergency distress system is thus vulnerable to breakdowns or delays in critical communications because there is no way for authorities to manage bandwidth usage. Telephone systems, including cellular telephone systems, typically give 911 traffic priority, but as indicated, in a large scale disaster the 911 system is likely to be overwhelmed.

Battery usage by mobile devices is another critical issue not addressed by current emergency distress systems. Any mobile device used for emergency communication only works as long as its batteries do. This is especially critical during large-scale disasters because users may be unable to recharge their devices, such as in a power outage. However, battery usage is often an issue during protracted personal emergencies as well. In a life-or-death situation, it is crucial that mobile devices used for emergency communication last as long as they possibly can.

Finally, current systems that use mobile devices for emergency communications do not provide for the organized dissemination of emergency information to all users of a mobile network by authorities. Particular communities, such as a university campus, have instituted emergency notification systems, but typically require users of the system to sign up for the service. People who have not signed up for the service do not receive the emergency notifications. Thus, in such a system, many people who are affected by an emergency do not receive the crucial emergency notifications. Some people who do receive the emergency notifications, such as people who are out of town, receive emergency notifications for emergencies that do not affect them. Such a system does not provide a way to broadcast an emergency notification to all users of a mobile network in a certain vicinity affected by an emergency, whether they have registered for such notifications or not.

Thus, there is a clear need for a system of operation of mobile networks and mobile network devices that is optimized for the conditions that characterize large-scale disasters. Such a system including features to conserve the battery of mobile devices would also be beneficial for maintaining communications between users and authorities during protracted personal emergencies.

SUMMARY OF THE INVENTION

The present invention teaches systems, devices, and methods for a telecommunications network, including a mobile network device, wherein, upon an event, a mobile network device enters a mode of operation defined as a sleep mode interrupted by periodic transmissions of a plurality of mobile network device and user information. Such a mode is referred to throughout this disclosure as an "emergency mode of operation" of the mobile network device. The plurality of mobile network device and user information includes information regarding a location of the mobile network device, a level of threat facing its user, the user's surroundings, etc. Events which trigger the mode of operation include a network command, user interaction, etc.

In one exemplary embodiment, the present invention is a mobile network device. The mobile network device includes a transceiver, a processor in communication with the transceiver, a memory in communication with the processor, an emergency response logic on the memory, a display in communication with the processor, and a keypad in communication with the processor. Upon an event, the device is powered only periodically to send a plurality of mobile device location information.

In another exemplary embodiment, the present invention is a system for determining a location of a mobile network device. The system includes a mobile network device, an antenna in communication with the mobile network device, and an emergency information processing server in communication with the antenna. Upon an event the mobile network device is powered only periodically to send location information to the emergency information processing server.

In yet another exemplary embodiment, the present invention is a method for determining a location of a mobile network device powered only periodically to send location and user information. The method includes receiving a plurality of location information from the mobile network device, and determining a location from the plurality of location information.

DETAILED DESCRIPTION OF THE INVENTION

The present invention teaches systems, devices, and methods for a telecommunications network, including a mobile network device, wherein, upon an event, a mobile network device enters a mode of operation defined as a sleep mode interrupted by periodic transmissions of a plurality of mobile network device and user information. Such a mode is referred to throughout this disclosure as an "emergency mode of operation" of the mobile network device. The plurality of mobile network device and user information includes information regarding a location of the mobile network device, a level of threat facing its user, the user's surroundings, etc. Events which trigger the mode of operation include a network command, user interaction, etc.

As used herein and throughout this disclosure, "sleep mode" refers to a mode of operation of a device in which all its functions are disabled aside from functions needed to restore the device to its fully operational state.

As used herein and throughout this disclosure, a "mobile network device" refers to a device through which users send or receive data or a wireless connection. Examples of mobile network devices include but are not limited to cellular telephones, satellite telephones, Personal Digital Assistants (PDAs), laptop computers, satellite telephones, GPS navigators, etc.

As used herein and throughout this disclosure, a "mobile network" is any telecommunications network which allows mobile network devices to communicate wirelessly. Examples of mobile networks include Personal Area Networks (BLUETOOTH); hotspots and private Wifi networks; cellular telephone networks including GSM, UMTS; satellite telephone networks; RFID networks; a GPS connection to orbiting satellites; etc.

Such a mobile network also includes "access points", which, as used herein and throughout this disclosure, refer to any network node through which a mobile device may access any or all of the mobile network. Examples of access points include mobile base stations, wireless routers, GPS satellites, cellular towers, satellite telephone satellites, etc.

In an exemplary embodiment of the present invention, such systems, devices, and methods are deployed during a large scale disaster wherein authorities supplement existing mobile network infrastructure with emergency deployment towers. These emergency deployment towers send a command to a plurality of mobile network devices to enter an emergency mode of operation. Once in the emergency mode of operation, a mobile network device periodically sends out mobile network device and user information. The emergency deployment towers receive the mobile network device location and user information. From the emergency deployment towers the information is forwarded to an Emergency Information Processing (EIP) server, where the information is organized. The EIP server then distributes the pertinent mobile network device and user information among a plurality of rescue receivers.

Figure 1:
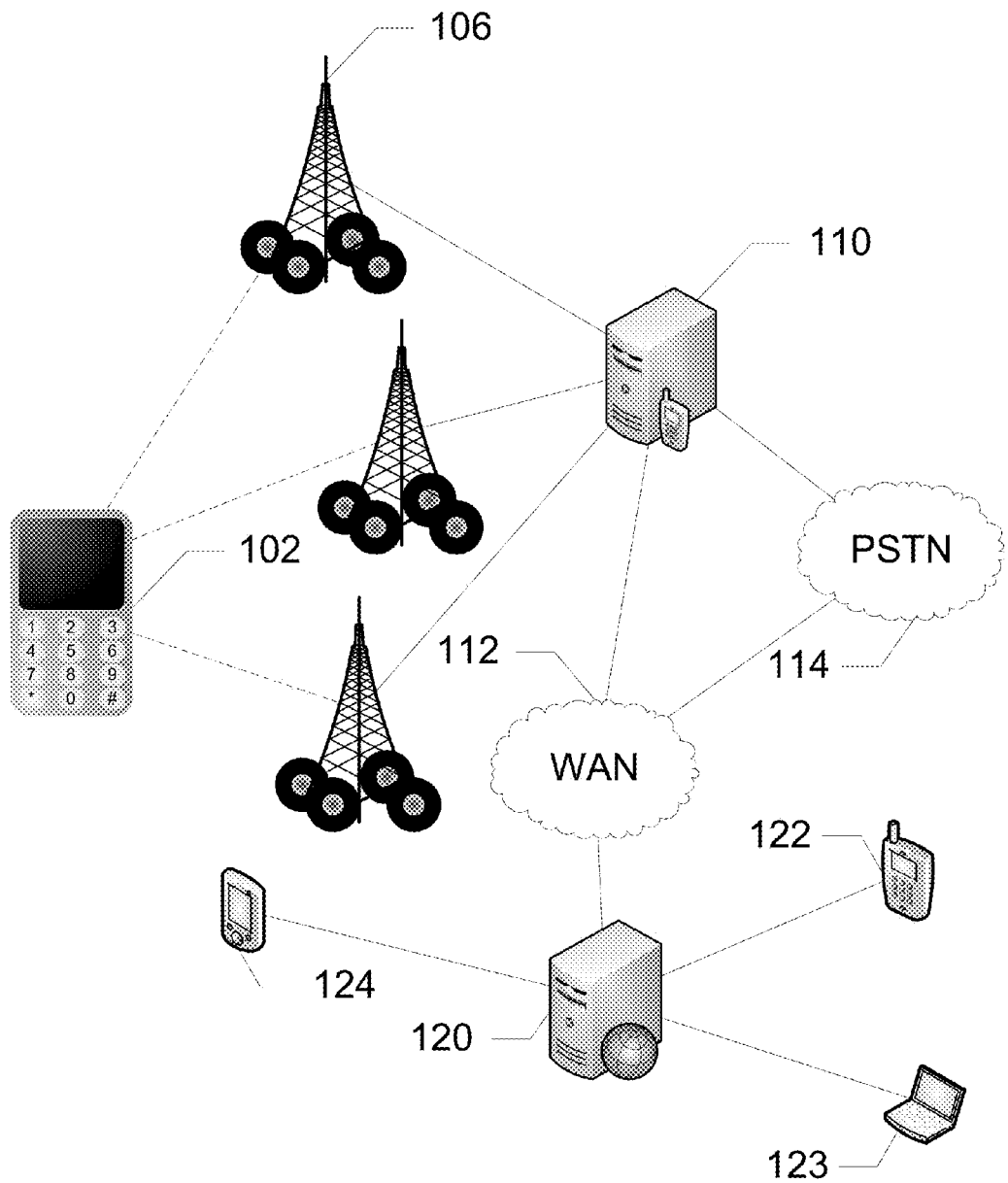
FIG. 1 shows a schematic diagram of a mobile network in one exemplary embodiment of the present invention.

FIG. 1 displays a schematic diagram of a mobile network in one exemplary embodiment of the present invention. A disaster has struck and there are no nearby access points for mobile network device 102. Once emergency deployment towers 106 are deployed, mobile network device 102 connects to the mobile network. Emergency deployment towers 106 are mobile wireless access points for mobile network device 102 to connect to an EIP server 120. Emergency deployment towers 106 maintain a connection to a wide area network (WAN) 112, such as the INTERNET, and via this connection to EIP server 120 and a mobile switching center 110. Mobile switching center 110 is responsible for managing the connection between mobile device 102 and emergency deployment towers 106. Mobile switching center 110 maintains a connection to a public switched telephone network 114. EIP server 120 is any suitable piece of hardware on the mobile network running algorithms to receive, organize, and distribute a plurality of mobile network device and user information. EIP server 120, via WAN 112, distributes the mobile device and user information to a plurality of rescue receivers 122, 123, and 124. A rescue receiver is any communication device capable of receiving, organizing, and displaying information of a user of a mobile network, including a location. The rescue receiver displays a geographical map showing a plurality of mobile network device locations and threat levels defined by the users of those mobile network devices. Equipped with a rescue receiver, a rescue worker reads the coordinates of the mobile network devices and can find them in order of threat level.

Communication between elements in FIG. 1 can be wired or wireless. A mobile network device can have multiple connections to the mobile network. These include connections through mobile base stations, emergency deployment towers, wireless access points, BLUETOOTH PANs, satellites, etc. The emergency deployment towers are not considered to be permanent features of the mobile network but rather temporary, possibly mobile, ad-hoc additions to the mobile network for some contingency, such as a disaster. Emergency deployment towers are driven on the backs of trucks, flown on the backs of airplanes or helicopters, etc. Some of the connections may not be active at all times in the event of a disaster. Some or all of the mobile base stations may not be active. In some embodiments, a mobile network device may be connected to the wide area network, such as the INTERNET, through a wireless router. In some embodiments, network satellites provide the mobile network device with GPS coordinates of the mobile network device. A rescue receiver can be portable or fixed in position. Suitable rescue receivers include cellular telephones, PDAs, fax machines, laptops, computers, satellite telephones, etc. Rescue receivers are in communication with the EIP server either directly or through the mobile network.

Figure 2:
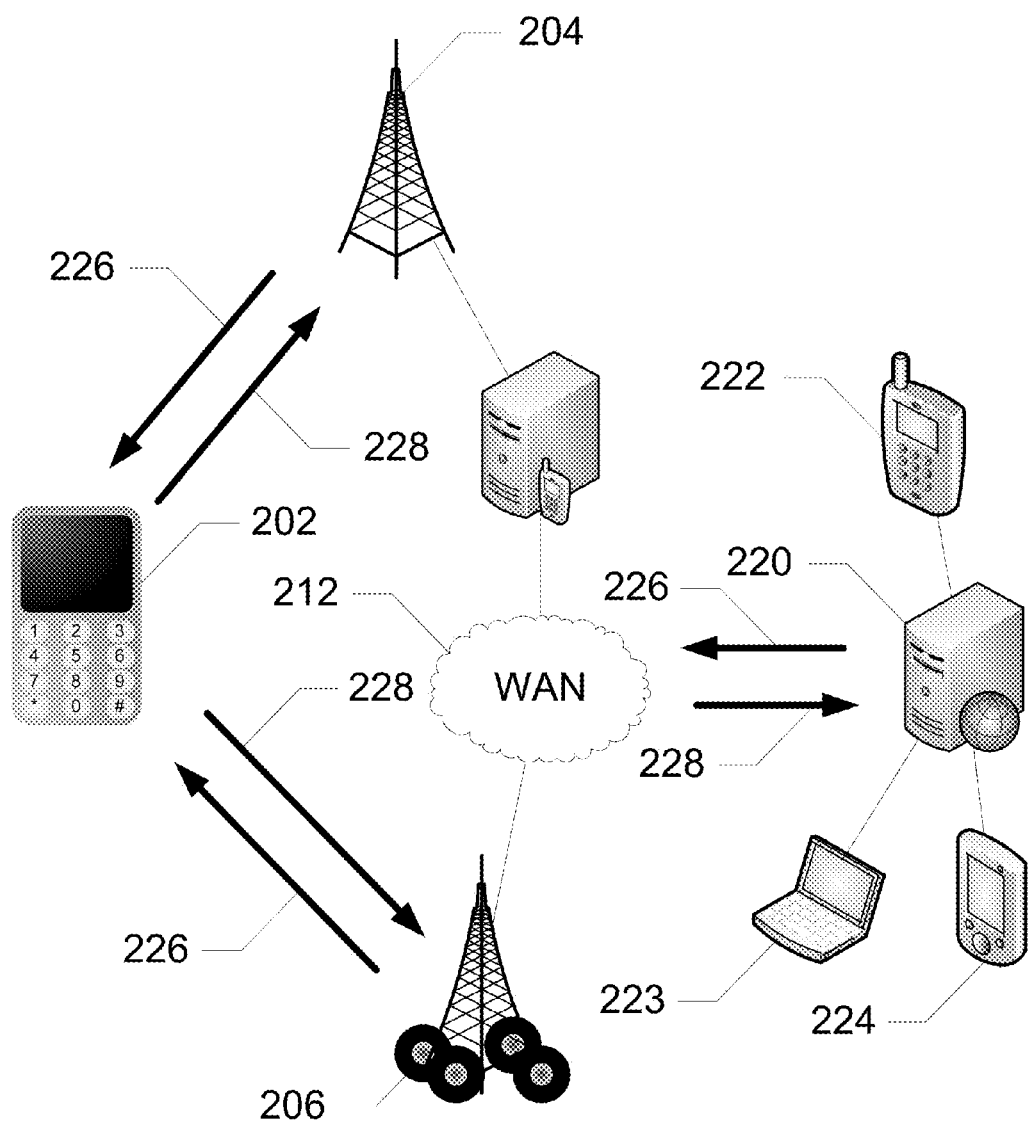
FIG. 2 shows how information, including location information, flows over a mobile network in one embodiment of the present invention.

FIG. 2 depicts how information, including location information, flows over a mobile network in one embodiment of the present invention. Elements of the network not crucial for understanding this flow of information have been omitted. An emergency signal 226 is generated and propagated via EIP server 220 to mobile base stations 204 and emergency deployment towers 206 via WAN 212. Emergency signal 226 comprises mobile network device instructions, emergency information, and requests for the user. Mobile base stations 204 and emergency deployment towers 206 broadcast emergency signal 226 for reception by mobile network device 202. Upon reception of the emergency signal 226, and provided the user does not override it, mobile network device 202 enters an emergency mode of operation. Thereupon, mobile network device 202 periodically sends a plurality of mobile network device and user information 228. Mobile network device 202 and user information 228 is received and forwarded via WAN 212 to EIP server 220. EIP server 220 distributes pertinent mobile network device and user information 228 to rescue receivers 222, 223, and 224.

In some embodiments, the user information includes a threat level defined by the user of the mobile network device 202. For example, a user can enter "1" to indicate that they are safe and in good health; "2" to indicate that they have a minor injury and/or face a small threat; "3" to indicate they have a major injury and/or face a major threat; or "4" to indicate an imminent threat to life or limb. In some embodiments, the pertinent information includes a mobile device location along with an associated radius of uncertainty in that location. The mobile network device 202 information may be of different types including GPS coordinates, cellular site IDs, small area network IDs, Location Based Service information, properties of the signal sending this information, etc. This information can be encoded in a Short Message Service (SMS) message. In some embodiments, the EIP server 220 uses the properties of the signal containing mobile network device 202 and/or user information 228 itself, as received by different mobile base stations or emergency deployment towers, to triangulate a location for the mobile network device 202. The period between transmissions of mobile network device 202 and user information 228 is dynamically adjustable and may be set based on the bandwidth available on the mobile network, the number of mobile network devices connected to the mobile network, user preference, etc. In an alternative embodiment of the present invention, the EIP server 220 distributes the mobile device and user attributes to the rescue receivers through the WAN 212.

The flow of information through the mobile network is directed by the EIP server 220. An emergency logic runs on the EIP server 220 where the information is requested, directed, and organized. This emergency logic can be triggered by a user in danger, officials responding to a disaster, etc. Once a disaster does happen, a series of events take place in order to remedy the situation.

Figure 3:
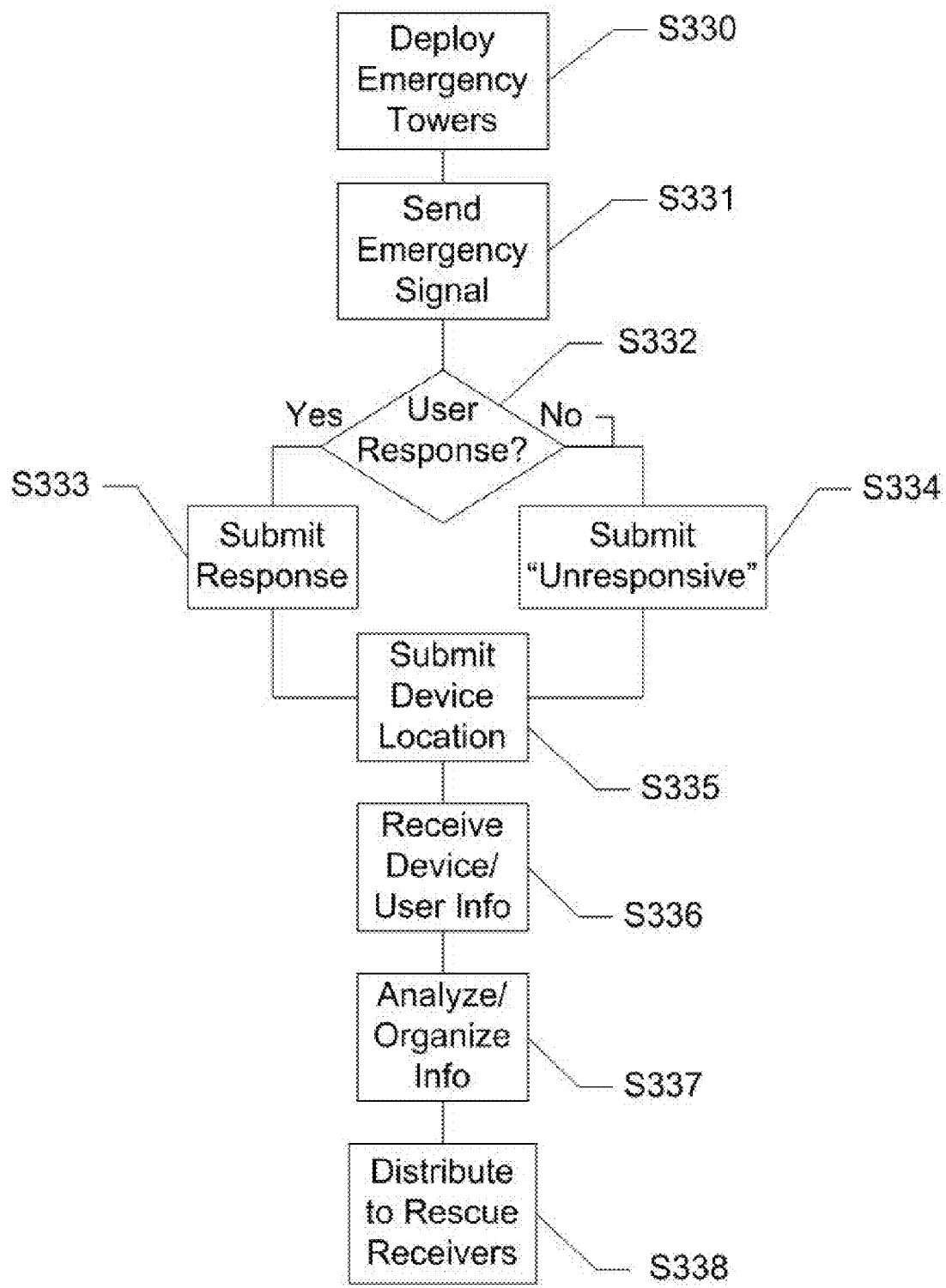
FIG. 3 shows a flow chart of a method of a rescue operation using mobile network devices in an emergency mode, according to an exemplary embodiment of the present invention.

FIG. 3 is a flow chart of a method of a rescue operation using mobile network devices in an emergency mode, according to an exemplary embodiment of the present invention. According to this method, the emergency deployment towers 106, 206 are deployed to supplement existing mobile network infrastructure, such as mobile service base stations 204, 704, S330. The mobile base stations 204, 704 and the emergency deployment towers 106, 206 send the emergency signal 226, S331. The mobile network device 102, 202, 402, 502, 702 receives the emergency signal 226 and the user of the mobile network device 102, 202, 402, 502, 702 is queried for a response, S332. If the user does not respond to the query, an "unresponsive" message is generated by the mobile network device 102, 202, 402, 502, 702 and sent through the mobile network, S334. If the user responds to the query, the response is sent through the mobile network, S333. Following that, the mobile network device 102, 202, 402, 502, 702 submits mobile network device 102, 202, 402, 502, 702 and user information 228, S335. The EIP server 120, 220, 720 then receives that information, S336. The EIP server 120, 220, 720 analyzes the mobile network 102, 202, 402, 502, 702 device and user information 228 to produce a location for the mobile network device 102, 202, 402, 502, 702 and organizes it for distribution to rescue receivers 122, 123, 124, 222, 223, 224, S337. Finally, the EIP server 120, 220, 720 distributes the location of the mobile network device 102, 202, 402, 502, 702 and the user information 228 to the rescue receivers 122, 123, 124, 222, 223, 224, S338.

In some embodiments, the initial query for the user response is a simple message asking the user if he or she is okay. The response can be a simple "yes" or "no", or a custom response can be input by the user. The initial query for the user response may also ask the user to define a personal "threat level" on a scale of one through four. In an alternative embodiment of the method of the present invention, steps S332-S338 are repeated until a signal is sent to the mobile network device canceling the emergency mode of operation.

A mobile network device, as used in the mobile network during an emergency, can be a range of devices. Many mobile devices on the market today can be used with little modification. In many instances, a software addition is sufficient.

Figure 4:
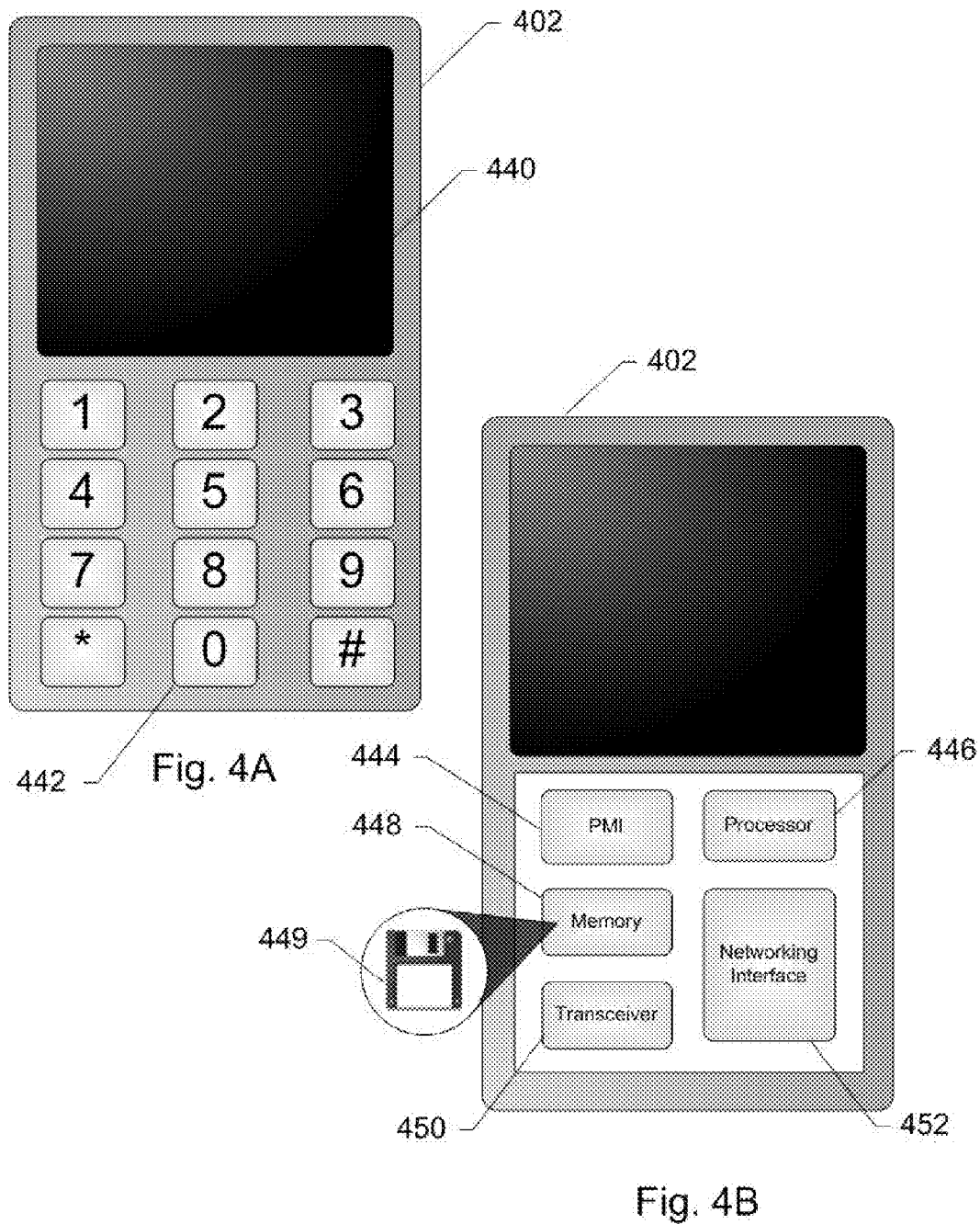
FIGS. 4A and B show schematic diagrams of the architecture of a mobile network device according to an exemplary embodiment of the present invention.

FIGS. 4A and 4B are schematic diagrams of the architecture of a mobile network device according to an exemplary embodiment of the present invention. A mobile network device 402 includes a screen 440, keypad 442, a power management interface (PMI) 444, a processor 446, a memory module 448, an emergency response logic 449 on memory module 448, a transceiver 450, and a network interface 452. Transceiver 450 receives the emergency signal and forwards the instruction to a processor 446 responsible for coordinating the operation of mobile network device 402. The emergency signal instructs mobile network device 402 to enter the emergency mode of operation or return from the emergency mode to its prior mode of operation. The instruction of the emergency signal is forwarded to memory module 448 before being read by processor 446.

If the emergency signal instructs mobile network device 402 to enter the emergency mode, emergency response logic 449 on memory module 448 instructs processor 446 to implement the emergency mode of operation. Then, processor 446 commands display 440 of mobile network device 402 to display a message asking the user if he/she wishes to cancel the emergency mode of operation. Through interaction with keyboard 442, the user chooses whether or not the emergency mode of operation should be implemented. Processor 446 waits a specified amount of time for the user interaction before the emergency mode of operation is executed automatically. The user choice is sent to processor 446. If the user indicates that the emergency mode should not be executed, no further action is taken by processor 446.

If the user indicates the emergency mode should be executed processor 446 implements a series of steps. In the first step of the series, processor 446 sends a message to display 440 asking the user to define a personal threat level. The user chooses their personal threat level through user interaction with keyboard 442 and the user choice is forwarded to processor 446. Mobile network device 402 is connected to a plurality of access points. In the second step, processor 446 queries a networking interface 452 to reply with a plurality of mobile network device location information. Such information includes access point IDs, location information provided by those access points, GPS coordinates, and Location Based Services (LBS) data. In the third step of the series, processor 446 sends the user's personal threat level and the mobile network device location information to transceiver 450 for transmission through the mobile network. Finally, processor 446 commands PMI 444 to put mobile network device 402 into sleep mode. Once in sleep mode mobile network device 402 does not "awaken" until user interaction or another emergency signal is received.

Alternately, there can be a length of time associated with the emergency mode. Once in sleep mode, and after waiting that length of time, processor 446 instructs power management interface 444 to wake up the device from sleep mode and repeats the series of steps. Waking up the device from sleep mode in this manner corresponds to restoring all functions of the mobile network device 402 that were shut down by the sleep mode. This cycle of sleep mode followed by the series of steps continues until processor 446 is instructed to return to its prior mode of operation from the emergency mode of operation.

If the emergency signal instructs the mobile network device to return to its prior mode of operation, the logic outputs this instruction to processor 446. Then, processor 446 commands display 440 to display a message saying "Returning to normal mode of operation". Processor 446 commands PMI 444 to wake mobile network device 402 from sleep mode and no longer periodically queries networking interface 452.

In other embodiments, the network interface may be the mobile network device's interface to the GPS system, an Assisted GPS (AGPS) system, or an interface to a wireless local area network. A user may input the response to an emergency mode through a touch screen or microphone.

Figure 5:
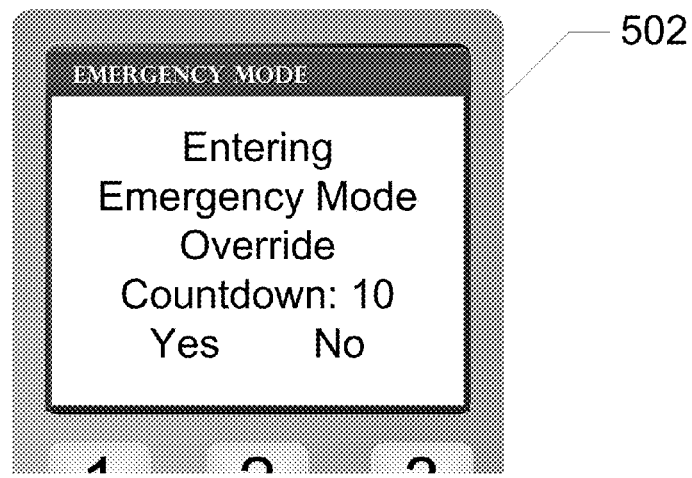
FIG. 5 shows a screenshot of the mobile network device receiving the emergency signal in one exemplary embodiment of the apparatus of the present invention.

FIG. 5 displays a screenshot of the mobile network device 502 receiving the emergency signal in one exemplary embodiment of the apparatus of the present invention. Upon reception of the emergency signal, the user is asked whether or not the mobile network device 502 should enter the emergency mode of operation. The user has ten seconds in which to respond "Yes" or "No" to this query, otherwise mobile network device 502 automatically enters the emergency mode of operation. A user entering "Yes" sends mobile network device 502 into an emergency mode.

In some embodiments of the apparatus of the present invention, a user of the mobile network device can, by configuring the settings on the mobile network device, "opt out" of the emergency mode of operation so that any emergency signals received by his/her mobile network device are ignored. This "opt out" ability is useful for a user who has privacy concerns about outside entities manipulating the operation of their mobile network device.

The rescue receivers are mobile devices used by emergency response personnel to locate and rescue users.

Figure 6:
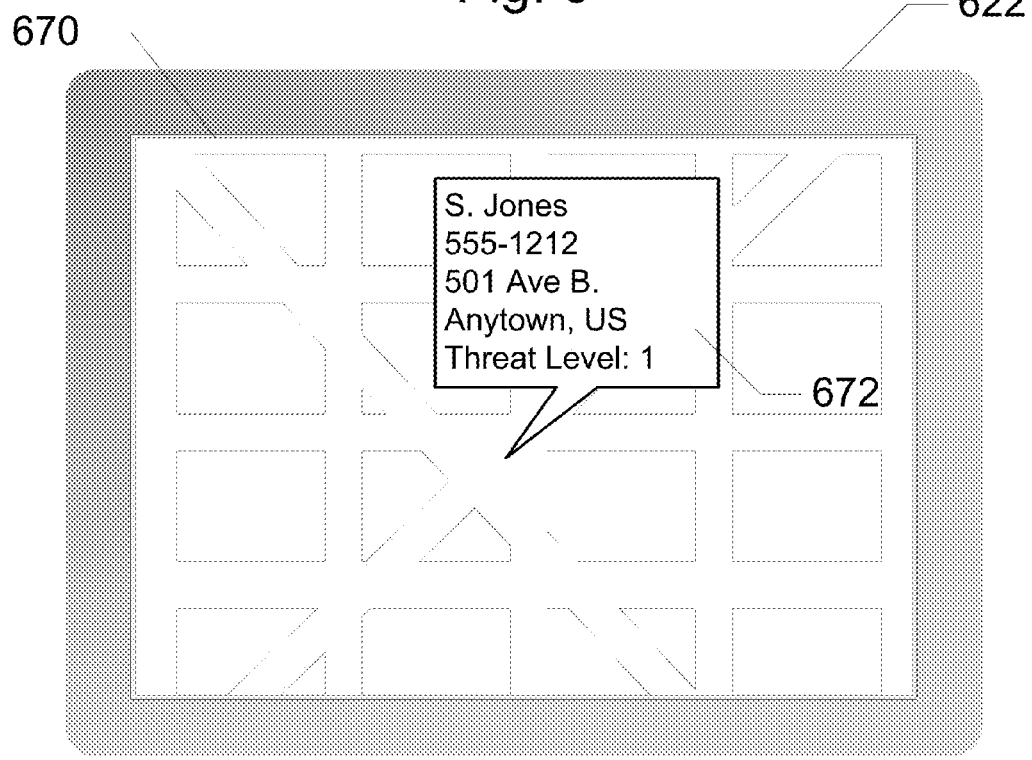
FIG. 6 shows a display of a rescue receiver in one exemplary embodiment of the present invention.

FIG. 6 shows a display 670 of a rescue receiver 622 in one exemplary embodiment of the present invention. The mobile network device and user information received by rescue receiver 622 is displayed in the form of a map with a user location indicated by dialog box 672. Dialog box 672 contains user information including biographical data such as name, address, phone number; a user-defined threat level; etc. In embodiments where the display is a touch screen, an operator of the rescue receiver can select a telephone number from the dialog box to automatically place a call to that telephone number. In some further embodiments, the mobile network recognizes that such a call is coming from rescue receiver and to connects the call whether or not the mobile network device is in an emergency mode of operation.

Figure 7:
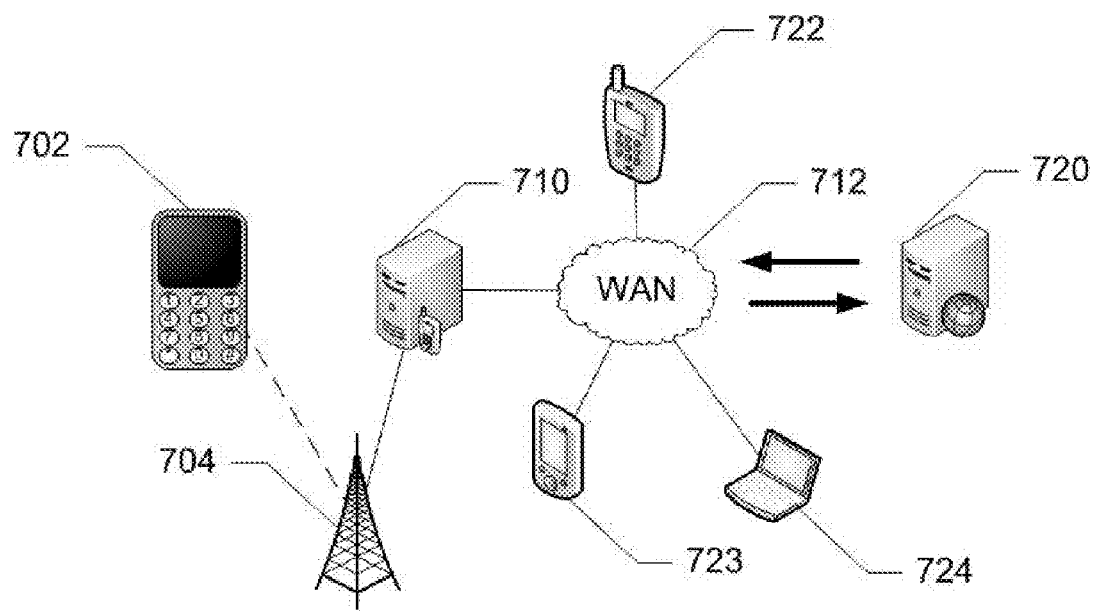
FIG. 7 shows how information, including location information, flows over the mobile network in an alternative embodiment of the present invention wherein the user initiates an emergency mode of operation of a mobile network device.

FIG. 7 depicts how information, including location information, flows over the mobile network in an alternative embodiment of the present invention wherein the user initiates an emergency mode of operation of a mobile network device 702. Activation of this mode of operation by the user causes a plurality of mobile network device and user information to be periodically sent out by mobile network device 702. Each time such information is sent, the mobile network device and user information is received by mobile base station 704 and passed to EIP server 720 via a mobile switching center 710 in communication with the EIP server 720 through a WAN 712. The EIP server parses the mobile network device and user information which is then sent via WAN 712 to a plurality of rescue receivers 722, 723, 724 for action.

A mobile network device suitable for allowing a user to initiate an emergency mode may not be complex. A logic or other software program can be loaded onto the memory module giving the mobile network device the ability to communicate to the EIP server an emergency message.

Figure 8:
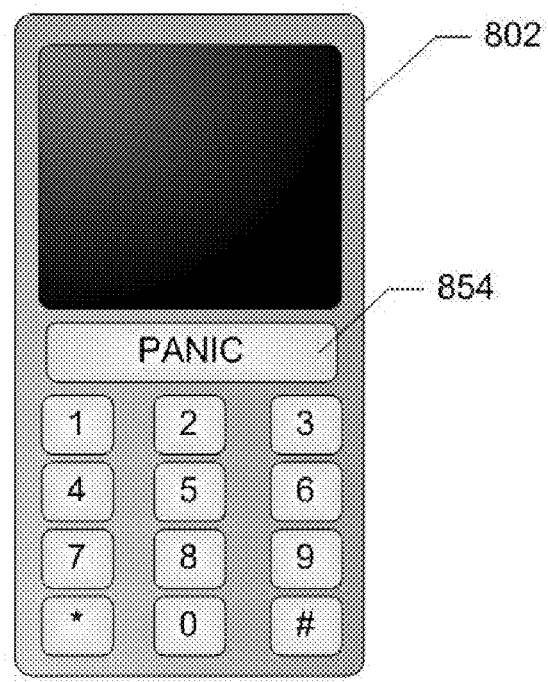
FIG. 8 shows a mobile network device in an exemplary embodiment of the present invention.

FIG. 8 shows a mobile network device 802 in an exemplary embodiment of the present invention. In this embodiment, the user has the ability to initiate the emergency signal through the use of a "panic button" 854 on the mobile network device.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A mobile network device, comprising:
  a processor; and a memory storing instructions, which, when executed by a processor, cause the processor to perform operations comprising:

receiving an emergency signal via a mobile emergency deployment tower, the emergency signal instructing the mobile network device to enter an emergency mode, in response to receiving the emergency signal via the mobile emergency deployment tower, displaying a first query on a display of the mobile network device, the first query asking a user of the mobile network device whether the emergency mode should be canceled, executing an emergency mode of operation after a specified amount of time without receiving a response to the first query to place the mobile network device in the emergency mode of operation, wherein when the mobile network device is in the emergency mode of operation, the mobile network device is placed in a sleep mode during which all functions of the mobile network device are shut down aside from any function required to restore the mobile network device to a normal mode of operation, providing a second query on the display of the mobile network device, the second query asking the user of the mobile device to define a personal threat level facing the user, determining location information associated with the mobile network device, wherein the location information comprises identifications of access points associated with the mobile network device and location based services data associated with the mobile network device, providing the personal threat level and the location information for transmission to a rescue receiver, and periodically restoring all of the functions of the mobile device shut down during the sleep mode to receive a further personal threat level and further location information.

2. The mobile network device of claim 1, further comprising a housing surrounding the processor and the memory.

3. The mobile network device of claim 1, wherein the mobile network device receives the emergency signal via a transceiver, the transceiver communicating using one of a personal area network, a satellite telephone network or a global positioning system.

4. The mobile network device of claim 1, wherein the display is a liquid crystal display.

5. The mobile network device of claim 1, wherein the display is a touch screen.

6. The mobile network device of claim 1, further comprising a panic button in communication with the processor.

7. The mobile network device of claim 1, wherein the rescue receiver displays the personal threat level and the location information from the mobile network device in a form of a map on the rescue receiver.

8. The mobile network device of claim 1, wherein the operations further comprise:

receiving a further emergency signal instructing the mobile network device to return to a normal mode of operation;

restoring all of the functions of the mobile network device that were shut down by during the sleep mode; and providing an indication on the display of the network device that the normal mode of operation is returned.

9. A method comprising:

receiving, at a mobile network device comprising a processor from a mobile emergency deployment tower, an emergency signal, the emergency signal instructing the mobile network device to enter an emergency mode;

in response to receiving the emergency signal, displaying, by the mobile network device, a first query on a display of the mobile network device, the first query asking a user of the mobile network device whether the emergency mode should be canceled;

executing, by the mobile network device, an emergency mode of operation after a specified amount of time without receiving a response to the first query to place the mobile network device in the emergency mode of operation, wherein when the mobile network device is in the emergency mode of operation, the mobile network device is placed in a sleep mode during which all functions of the mobile network device are shut down aside from any function required to restore the mobile network device to a normal mode of operation;

providing, by the mobile network device, a second query on the display of the mobile network device, the second query asking the user of the mobile device to define a personal threat level facing the user;

determining, by the mobile network device, location information associated with the mobile network device, wherein the location information comprises identifications of access points associated with the mobile network device and location based services data associated with the mobile network device;

providing, by the mobile network device, the personal threat level and the location information for transmission to a rescue receiver; and periodically restoring, by the mobile network device, all of the functions of the mobile device shut down during the sleep mode to receive a further personal threat level and further location information.

10. The method of claim 9, wherein the second query comprises a scale of personal threat levels from which the personal threat level facing the user is chosen.

11. The method of claim 9, wherein the rescue receiver displays the personal threat level and the location information from the mobile network device in a form of a map on the rescue receiver.

12. The method in claim 9, further comprising:

receiving a further emergency signal instructing the mobile network device to return to a normal mode of operation;

restoring all of the functions of the mobile network device that were shut down by during the sleep mode; and providing an indication on the display of the network device that the normal mode of operation is returned.

* * * * *